Oct. 11, 1966    E. J. ROSS    3,278,823

SELF-CONTROLLED, SOLID STATE, TWO-STEP BATTERY CHARGER

Filed July 12, 1963

INVENTOR.
EDWARD J. ROSS
BY
Rupert J. Brady
ATTORNEY

United States Patent Office 3,278,823
Patented Oct. 11, 1966

3,278,823
SELF-CONTROLLED, SOLID STATE, TWO-STEP BATTERY CHARGER
Edward Joseph Ross, White Oak, McKeesport, Pa., assignor to Mine Safety Appliances Company, Pittsburgh, Pa., a corporation of Pennsylvania
Filed July 12, 1963, Ser. No. 294,482
4 Claims. (Cl. 320—23)

This invention relates broadly to voltage regulating apparatus adaptable for charging a storage battery, and more particularly to a self-controlled, two-step battery charging circuit.

Battery chargers in the past have generally been designed to either charge a battery at a relatively high rate of charge and then stop the charge after a time lapse, or to charge a battery at a high rate initially and then taper down to a low floating charge rate.

The disadvantage of a charger using the first charging method is that it requires attention during use. An automatic timer cannot be used advantageously unless the charger is regulated and temperature controlled, since batteries react differently at different temperatures. On the other hand, a regulated, temperature controlled, timed battery charger would become rather elaborate and in many cases uneconomical.

The tapered type charger, operating according to the second mentioned charging method, has been more popular in the industry since it tries to maintain a constant potential. It attempts to control the rate of current flow by maintaining constant voltage. This type charger also has its limits in that it does not reduce the current to a controlled float charge under all battery and temperature conditions. It must also supply a large current flow at the beginning of a charging cycle, thus requiring that the charger components possess sufficient capacity to handle the initial large current surge. The remainder of the tapering charge is operated well below the handling capacity of the charger components, but the surge condition becomes even more severe when a multiple number of batteries are to be charged in parallel. Also, in regulated chargers of this type, the float rate is usually too high.

Another disadvantage occurs in parallel charging of a multiple number of batteries when a shorted battery is placed in a charging rack. It prohibits the charging of the remaining batteries if unfused. In multiple series charging, an open or corroded high resistance terminal also reduces the charging rate of the remaining batteries. Also, when a malfunction occurs in the charger itself, all the batteries in the rack remain uncharged.

Battery fluid consumption is directly related to charging rates and degree of overcharging. Gassing within the battery usually occurs after the battery has reached more than 90% of its charge. It is then advantageous to reduce the charging rate to a minimum value near the 90% point. This action will reduce battery watering maintenance time and prolong the life of the battery. In sealed cells, gassing must be maintained at a minimum to retain the sealing feature of the battery, lest the battery be ruptured. In charging a plurality of batteries with a single charger it is impossible to give the batteries the needed individual attention to overcome these disadvantages without constant supervision and checking.

Therefore, it appears that the ultimate in battery charging centers around a single unit charger for each battery which can operate within anticipated temperature and line voltage limits, charge at the maximum permissible rate, then transfer itself to a floating charge rate automatically and require no supervision.

It has been found that the advent of semi-conducting devices has made it possible to provide a self-sensing battery charger that can be adjusted to charge any type battery and transfer itself from its charging rate to a floating rate, under varying line voltage fluctuations, provided that the temperature variations are within the functioning limits of the battery itself. With the inventive circuit disclosed herein it has become practical and economical to supply one charger per battery when charging in multiple, thus eliminating the disadvantages associated with multiple charging.

Therefore, one of the objects of the invention is to provide a battery charger which requires no supervision during the charging cycle and which will automatically transfer itself from a maximum charging rate to a floating rate in accordance with the requirement of the battery being charged.

Another object of the invention is to provide a battery charging apparatus which makes it practical and economical to provide one charger for each battery even in an installation for charging a multiple number of batteries simultaneously.

Another object of the invention is to provide a construction of battery charger which is adaptable for charging any type battery.

Still another object of the invention is to provide a battery charger circuit which does not require accurate line voltage regulation for proper operation of the charger.

A further object of the invention is to provide a simple and novel arrangement of battery charger having no moving parts and utilizing solid state and semi-conductor devices, and which overcomes all of the disadvantages of existing type systems mentioned above.

Other and further objects of the invention reside in the charger circuit structure and feature whereby the charger need not be turned off, as set forth more fully in the specification hereinafter following by reference to the accompanying drawings, in which.

Figure 1:
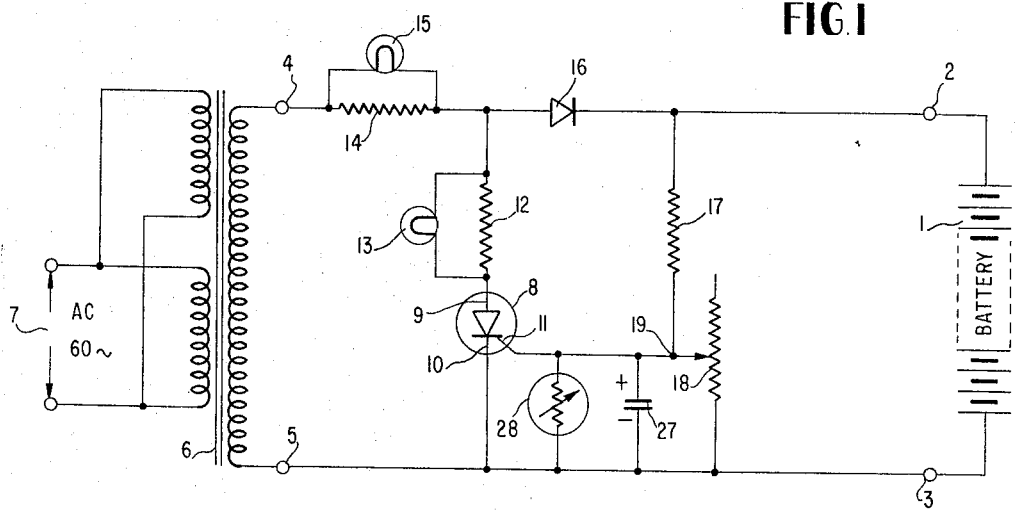
FIG. 1 is an electrical schematic diagram of the battery charger circuit of the invention.

Referring to the drawings in greater detail, the self-controlled, two-step battery charger circuit of the invention, shown in FIG. 1, for charging storage battery 1 connected across the charger output terminals 2 and 3, is supplied with an alternating current across input terminals 4 and 5 from the secondary winding of transformer 6, the primary circuit of which is appropriately connected to a source of A.C. potential at 7. The source of potential exciting transformer 6 may be the ordinary 110 v. A.C. 60-cycle supply, or the like.

The battery charger is a half-wave charger controlled by a solid state device, namely, a silicon-controlled rectifier 8 having an anode 9, cathode 10 and gate electrode 11. A resistor 12 shunted by a green indicator lamp 13 is connected to the anode 9 of the controlled rectifier and the series circuit of resistor 12 and controlled rectifier 8 is connected in shunt across the secondary of transformer 6 and current limiting resistor 14 connected in electrical series therewith. Indicator lamp 15 which indicates whether or not the circuit is operating, as explained more fully further in this specification, is connected across limiting resistor 14, with the junction of resistors 12 and 14 connected to output terminal 2 through diode rectifier 16 which forms a half-wave rectifier circuit and aids in limiting the maximum current which can be delivered by the charger.

Figure 2:
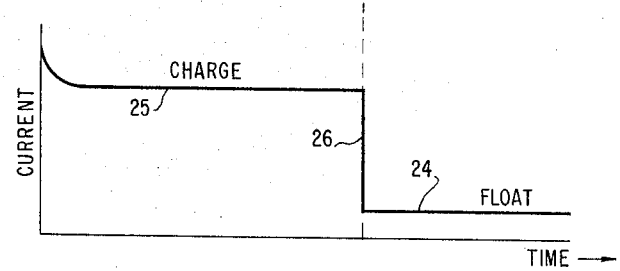
FIG. 2 is a graphic plot of current verus time illustrating the battery charger current output to the battery.

A voltage divider circuit consisting of resistor 17 and rheostat 18 is connected in shunt across the output terminals 2 and 3, with the junction 19 of resistor 17 and rheostat 18 being connected to gate electrode 11 such that the potential of battery 1 connected across output terminals 2 and 3 is sensed directly at the gate electrode 11 so the state of charge of the battery is disposed to directly operate controlled rectifier 8. With this circuit connection as the battery voltage, as indicated by curve 21 in FIG. 3, increases toward its fully charged condition 22, the voltage at junction 19 increases accordingly, as shown by curve 20 in FIG. 3, which represents the voltage charge curve at junction 19 relative to time. Increasing the voltage at junction 19 which is the same as increasing the voltage at controlled rectifier gate 11, causes an increase in gate current flow. Rheostat 18 is set so that when the battery becomes fully charged, as indicated at 22 in FIG. 3, the gate firing point 23 is substantially simultaneously reached to switch the controlled rectifier 8 from its normally non-conducting state to a fully conducting state which acts to shunt the output terminals 4 and 5 of transformer 6, causing a lower current flow to the battery called the floating charge rate. The battery will be held on the floating charge rate until it is disconnected from output terminals 2 and 3. The floating charge rate is indicated at 24 in the current curve of FIG. 2, while the maximum charging rate delivered by the charger is shown by that portion of the curve associated with reference numeral 25. Curve portion 26 indicates the instant of the change of state of controlled rectifier 8 and it should be noted that the current, voltage and ampere-hour characteristic curves of FIGS. 2, 3 and 4 respectively are all correlated to the same time scale.

The circuit is completed by a bypass capacitor 27 and a thermistor 28, each connected in shunt across the gate-to-cathode circuit 11–10 of controlled rectifier 8 and across the rheostat 18. The operations of these elements will be explained more fully hereinafter following.

A choice of series or parallel control for silicon-controlled rectifiers exists and parallel control was selected in the circuit of the present invention, to take advantage of the additional line voltage compensation associated with this method of control and to gain the added advantage of the circuit structure thus produced which eliminates the need to turn the charger on and off charge. Thus the charger never needs to be turned off or on as it does so automatically. This is a desirable feature, particularly in mining operations where battery chargers are in use the majority of the time and the period of nonuse is normally only during shift changes.

When a discharged battery is placed across the charger output terminals 2 and 3 by forcing its terminals into the spring-loaded output terminals, the charger senses the lower battery potential and turns itself on, that is, switches itself to the charging state. This action takes place due to the lowered voltage at gate 11 caused by the battery potential, and this resuls in a lowered gate current. Normally once a silicon-controlled rectifier is turned on it remains on until its anode potential is reduced to zero. The A.C. sine wave appearing on the output of the secondary winding of transformer 6 automatically passes through zero every half cycle which means that when the voltage on gate 11 is reduced below the firing voltage, controlled rectifier 8 will turn itself off at the next half cycle and the battery charger will therefore turn itself on. The controlled rectifier 8 thus becomes nonconducting and breaks the shunt circuit which it forms across the transformer secondary. The maximum charging current flows from input terminal 4 through the parallel circuit of resistor 14 and lamp 15, rectifier 16, output terminal 2, battery 1, output terminal 3 and terminal 5 of the secondary winding of transformer 6. A small current also flows through the voltage divider network formed by resistor 17 and rheostat 18. As battery 1 becomes charged, the voltage at gate 11 of controlled rectifier 8 increases accordingly. There is therefore a slight current flow through the gate-to-cathode junction 11–10 as well as through the thermistor 28, both of which parallel the rheostat 18. Capacitor 27 also parallel rheostat 18 and acts as a bypass to filter the half-wave ripple that exists at the gate 11.

Themistor 28 is a temperature compensating component which tends to shunt the rheostat 18 and the gate-to-cathode circuit 11–10 of rectifier 8, an amount proportional to the variations in temperature. The controlled rectifier 8 has a tendency to fire with less gate current as ambient temperature increases and therefore the thermistor decreases in resistance with increasing ambient temperature to cause more current to flow through it, which in turn causes a greater voltage drop across resistor 12, thus lowering the gate voltage. This is effectively the same result as would be obtained by lowering the resistance of rheostat 18.

Since the temperature characteristics of the silicon-controlled rectifier gate circuit are such that the controlled rectifier tends to fire at a point above or below the fully charged point of the battery, due to the temperature sensitive gate-to-cathode junction, an increasing temperature at the gate decreases the resistance thereof causing a higher leakage current to flow and this causes the gate firing current to be reached at a lower battery terminal voltage. This would result in an undercharged battery since the charger would be turning off too soon, but by placing a thermistor 28 of proper value in the circuit, in shunt across the gate circuit 11–10, the controlled rectifier 8 is kept from firing to turn the charger on floating charge rate until the proper battery voltage is reached. When the battery is fully charged as indicated at 22, in FIG. 3, the firing point 23 of the controlled rectifier 8 is simultaneously reached and the rectifier changes from a non-conducting state to a fully conducting state, thus placing a shunt circuit across the output of transformer 6. The circuit therefore compensates for variations in the operation of the silicon-controlled rectifier at different ambient temperatures according to one object of the present invention.

In the conducting state of controlled rectifier 8 the majority of current flow is from terminal 4 through the parallel circuit of resistor 14 and lamp 15, through the parallel circuit of resistor 12 and floating rate lamp 13, controlled rectifier 8 and terminal 5, back to the secondary winding of transformer 6. The current through the battery via rectifier 16 is consequently reduced to a lower rate, called the floating charge rate. The floating charge rate delivered by the charger is determined by the values of resistors 12 and 14, ignoring the slight load of the lamps 13 and 15 connected in parallel therewith. The maximum charging rate delivered by the charger is mainly determined by the value of resistor 14 which, in conjunction with rectifier 16, also determines the final voltage reached at output terminals 2 and 3. The resistance of lamp 15 changes with changes in line voltage which also aids in maintaining a degree of regulation, although regulation in this circuit is of little consequence.

The battery, when connected to the charger across the output terminals 2 and 3, only needs to be slightly discharged for the charger to sense the need to switch itself into the maximum charging state. The charger will then charge the battery only for the duration required as demanded by the degree of battery discharge, with the charge on the battery itself operating the switching of the charger from the maximum charge rate to the floating charge rate. Rheostat 18 determines the switching point of the charger and this point is adjustable to suit the proper "firing" or return-to-float charge voltage setting for gate 11 of the controlled rectifier.

The indicator lamps 15 and 13 are used to determine the charging state of the circuit with red lamp 15 indicating that the charger is "ON" and green lamp 13 indicating that the charger is on the floating rate. Red lamp 15 is illuminated continuously while the green lamp 13 is illuminated only when the controlled rectifier 8 is conducting or is "fired." These indicator lamps are also used as a fail-safe feature. If, after a sufficient number of hours have elapsed with the charger on the maximum charge rate and the green lamp 13 has not yet turned "ON," an observer can suspect either a shorted battery or a defective controlled rectifier circuit. When the red lamp is "OUT" it indicates a defective charger or a defective bulb. Placing an open or high contact resistance battery into the charger circuit will illuminate the green lamp 13 immediately, while placing a shorted battery into the charger circuit will cause the red lamp 15 to glow very brightly. If left on in this condition the transformer temperature will rise and remain hot until an observer recognizes that the green lamp 13 has not turned on after a sufficient time lapse to indicate a malfunctioning battery.

Figure 3:
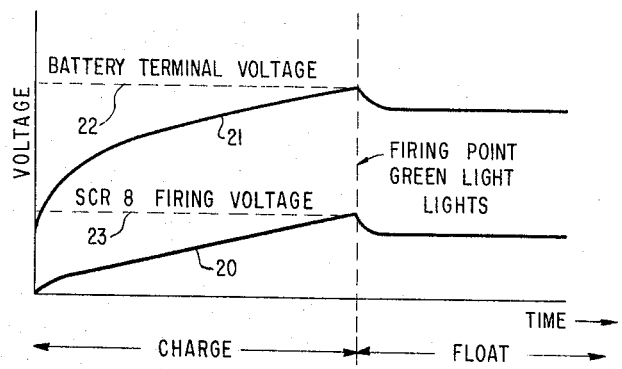
FIG. 3 is a graphic plot of voltage versus time corresponding to FIG. 2, illustrating the battery charging curve and a curve illustrating the corresponding increase in voltage at the gate of the solid state device.
Figure 4:
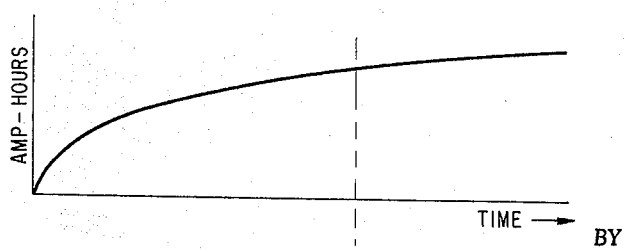
FIG. 4 is a graphic plot correlated to the plots of FIGS. 2 and 3, illustrating the ampere-hour characteristics of the charger of the invention.

As previously stated the firing point of controlled rectifier 8 is determined by the adjustment of rheostat 18 as indicated at 23, in FIG. 3. This firing point is set by placing a fully charged battery into output terminals 2 and 3 and adjusting rheostat 18 so that the green lamp 13 illuminates at the end-of-charge potential of the battery 1.

Accurate line voltage regulation is not required by this charger and it has the capacity to sense the fully charged battery condition under all practical environmental conditions. If line voltage conditions cause the charging rate to vary up or down, the fully charged point will be reached sooner or later to compensate for the change. A full-wave current controlled charger can be had in place of the half-wave type charger as described herein, merely by duplicating the system to cause rectification of the opposite half cycle of the applied A.C. supply.

Although this charger was originally designed to charge nickel-iron batteries, it can be constructed to charge any type battery, such as nickel-cadmium and lead-acid, by making resistors 14 and 12 adjustable so that the circuit can be adjusted to yield a variety of maximum charging and floating charge rates to suit the various battery requirements. The transformer 6 determines the operating voltage range and rheostat 18 sets the "fully charged" or circuit switchover point. If desired, meters can be provided to aid in adjusting the various adjustable components 12, 14 and 18 to make the circuit a universal type battery charger.

While the battery charger of the invention has been described in certain preferred embodiments it is realized that modifications can be made and it is to be understood that no limitation upon the invention are intended other than those which may be imposed by the scope of the appended claims.

What I claim as new and desire to secure by Letters Patent of the United States, is as follows:

1. A two-step charging regulator for a charge storage means comprising, transforming means having a primary winding adapted for connection across an A.C. source and a secondary winding, a controlled electronic rectifier having an anode, cathode and a gate electrode, a resistor having one end connected to said anode and the other end connected to one end of said secondary winding, said cathode connected to the other end of said secondary winding to connect the series circuit of said resistor and said controlled electronic rectifier in shunt with the entire secondary winding, first and second output terminals adapted for connection to a charge storage means, unidirectional means connected between the end of said resistor connected to said secondary winding and said first output terminal and connected to pass charging current only in the direction of said first output terminal, said second output terminal connected to said cathode, a voltage divider circuit connected across said first and second output terminals, and said gate electrode connected in said voltage divider circuit at a preselected point, whereby the low potential of a charge storage means connected across said first and second output terminals is sensed at said gate electrode through said voltage divider circuit to maintain said controlled rectifier nonconductive while said charging regulator delivers maximum charge to said storage means and the preselected fully charged potential of the charge storage means is sensed at said gate electrode to switch said controlled rectifier to its conducting state to deliver a reduced charge to the storage means after it has charged to the preselected charge.

2. A two-step charging regulator as set forth in claim 1 including a second resistor connected between said other end of said first mentioned resistor and said one end of said secondary winding.

3. A two-step charging regulator as set forth in claim 1 including a thermistor connected between said gate electrode and said cathode for stabilizing the operation of said regulator against changes in ambient temperature.

4. A two-step charging regulator as set forth in claim 2 including a first indicator lamp connected across said first mentioned resistor for illumination only when the regulator is delivering a reduced charge, and a second indicator lamp connected across said second resistor for illumination when both the maximum and reduced charge are being delivered by the regulator.

References Cited by the Examiner

UNITED STATES PATENTS

| | | | |
|---|---|---|---|
| 3,041,522 | 6/1962 | Beck et al. | 320—48 X |
| 3,062,998 | 11/1962 | Medlar | 320—48 X |
| 3,114,095 | 12/1963 | Palmer | 320—39 |
| 3,121,837 | 2/1964 | Holm et al. | 320—35 X |
| 3,141,124 | 7/1964 | Atherton | 320—1 |
| 3,152,298 | 10/1964 | Byles | 320—35 X |
| 3,176,210 | 3/1965 | Bethke | 320—40 |
| 3,196,334 | 7/1965 | Flanders | 320—1 |

JOHN F. COUCH, *Primary Examiner.*

LLOYD McCOLLUM, *Examiner.*

S. WEINBERG, *Assistant Examiner.*